(12) United States Patent
Kim et al.

(10) Patent No.: US 10,675,979 B2
(45) Date of Patent: Jun. 9, 2020

(54) IN-CABLE CONTROL BOX MOUNTED ON ELECTRIC VEHICLE CHARGING CABLE AND METHOD FOR CHARGING ELECTRIC VEHICLE USING THE SAME

(71) Applicants: HYUNDAI MOTOR COMPANY, Seoul (KR); KIA MOTORS CORPORATION, Seoul (KR)

(72) Inventors: Ji Hown Kim, Gwangmyeong-si (KR); Chang Min Yang, Bucheon-si (KR); So Jin Lee, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 347 days.

(21) Appl. No.: 15/637,312

(22) Filed: Jun. 29, 2017

(65) Prior Publication Data

US 2018/0001776 A1    Jan. 4, 2018

(30) Foreign Application Priority Data

Jul. 1, 2016  (KR) .................. 10-2016-0083683
Jun. 16, 2017  (KR) .................. 10-2017-0076898

(51) Int. Cl.
*B60L 53/00* (2019.01)
*B60L 11/18* (2006.01)
(Continued)

(52) U.S. Cl.
CPC ........... *B60L 11/1816* (2013.01); *B60L 53/14* (2019.02); *B60L 53/16* (2019.02); *B60L 53/18* (2019.02); *B60L 53/30* (2019.02); *B60L 53/60* (2019.02); *B60L 53/65* (2019.02); *B60L 53/665* (2019.02); *G06Q 50/06* (2013.01); *G07F 15/005* (2013.01); *H02J 7/007* (2013.01); *Y02T 10/7005* (2013.01); *Y02T 10/7088* (2013.01); *Y02T 90/121* (2013.01); *Y02T 90/128* (2013.01);
(Continued)

(58) Field of Classification Search
CPC .................................................... B60L 11/1816
USPC ........................................................ 320/109
See application file for complete search history.

(56) References Cited

U.S. PATENT DOCUMENTS

2013/0020992 A1* 1/2013 Wu ...................... H01M 10/44
                                                              320/109
2014/0203777 A1* 7/2014 Flack ...................... B60L 3/04
                                                              320/109

OTHER PUBLICATIONS

Design Guide for Combined Charging System by Matthias Kubel, Feb. 6, 2015.*

* cited by examiner

*Primary Examiner* — Robert Grant
(74) *Attorney, Agent, or Firm* — Morgan, Lewis & Bockius LLP

(57) ABSTRACT

An in-cable control box (ICCB) mounted on an electric vehicle (EV) charging cable, which performs conductive charging for an EV as connected to a power outlet and an inlet of the EV, includes at least one processor, a first communication module, a second communication module, and a memory storing instructions executed by the at least one processor. Also, the instructions are configured to cause the first communication module to collect information on an EV by communicating with an electric vehicle communication controller (EVCC) of the EV; and cause the second communication module to transmit the information on the EV to a supply equipment communication controller (Continued)

(SECC). As such, it is possible to charge the EV in an economical manner as compared to a standard defining conductive charging process.

18 Claims, 7 Drawing Sheets

(51) Int. Cl.
*B60L 53/14* (2019.01)
*B60L 53/60* (2019.01)
*B60L 53/65* (2019.01)
*B60L 53/66* (2019.01)
*B60L 53/30* (2019.01)
*B60L 53/16* (2019.01)
*B60L 53/18* (2019.01)
*G06Q 50/06* (2012.01)
*G07F 15/00* (2006.01)
*H02J 7/00* (2006.01)

(52) U.S. Cl.
CPC ................ *Y02T 90/14* (2013.01); *Y02T 90/16* (2013.01); *Y02T 90/163* (2013.01); *Y02T 90/169* (2013.01); *Y04S 30/14* (2013.01)

IN-CABLE CONTROL BOX MOUNTED ON ELECTRIC VEHICLE CHARGING CABLE AND METHOD FOR CHARGING ELECTRIC VEHICLE USING THE SAME

CROSS-REFERENCE TO RELATED APPLICATION

This application is based on and claims the benefit of priority to Korean Patent Application No. 2016-0083683 filed on Jul. 1, 2016, and Korean Patent Application No. 2017-0076898 filed on Jun. 16, 2017 with the Korean Intellectual Property Office (KIPO), the entire contents of which are hereby incorporated by reference as if fully set forth herein.

TECHNICAL FIELD

The present disclosure relates to an in-cable control box (ICCB) mounted in an electric vehicle charging cable, and more particularly, to an ICCB having a Wi-Fi module and a method for charging an electric vehicle using the same.

BACKGROUND

An electric vehicle (EV) charging system may basically be defined as a system for charging a battery mounted on an EV by using power of an energy storage device or a power grid of a commercial power source. Such the EV charging system may have various forms according to the type of EV For example, an EV charging system may include a conductive charging type using a charging cable or a non-contact wireless power transfer (WPT) type (also referred to as an 'inductive charging type').

The conductive charging type of EV charging system may use a charging cable having a connector to connect an inlet of the EV to a charging stand and charge alternating current (AC) power of the charging stand to the battery of the EV through an on-board charger (OBC) of the EV.

Further, the conductive charging type of EV charging system may be configured to connect the inlet of the EV with an off-board charger using a rapid charging cable having a connector, and charge the EV with direct current (DC) power of the off-board charger.

A battery management system (BMS) of the EV may communicate with the charging stand or the off-board charger in order to charge the EV.

Meanwhile, a conventional EV charging system including the conductive charging type or the inductive charging type has to use a separate communication network for billing for the charging, thereby increasing communication costs of users. In addition, a payment device or method that is used in accordance with the standard or generally used should be used for payment of the EV charging, and a separate security technology should be applied to the payment process. Thus, there are disadvantages that equipment cost increases and a billing process becomes complicated.

SUMMARY

Accordingly, embodiments of the present disclosure are provided to substantially obviate one or more problems due to limitations and disadvantages of the related art.

Embodiments of the present disclosure provide an in-cable control box (ICCB) mounted on an electric vehicle (EV) charging cable, which performs a conductive charging for an EV in an economical manner compatible with a standard defining conductive charging process.

Embodiments of the present disclosure also provide an EV conductive charging method performed in a supply equipment communication controller (SECC), which performs the conductive charging for an EV in an economical manner compatible with a standard defining conductive charging process.

Embodiments of the present disclosure also provide an SECC which performs the conductive charging for an EV in an economical manner compatible with a standard defining conductive charging process.

According to embodiments of the present disclosure, an ICCB mounted on an electric vehicle (EV) charging cable may be provided. The ICCB may comprise at least one processor, a first communication module, a second communication module, and a memory storing instructions executed by the at least one processor. Also, the instructions may be configured to cause the first communication module to collect information on an EV by communicating with an electric vehicle communication controller (EVCC) of the EV; and cause the second communication module to transmit the information on the EV to an SECC.

The ICCB may further include a watt-hour meter for cumulatively measuring an amount of electric power charged into the EV.

The first communication module may perform a power line communication. (PLC), and the PLC may conform to a protocol according to an international standardization organization (ISO) 15118-3 or an ISO 12139.

The second communication module may perform a wireless fidelity (Wi-Fi) communication, and the Wi-Fi communication may conform to a protocol according to an ISO 15118-8.

The instructions may be further configured to cause the first communication module to establish a communication connection with the EVCC based on a signal level attenuation characterization (SLAC) communication according to a SLAC communication connection request from the EVCC.

The instructions may be further configured to cause the second communication module to transmit a wireless communication connection request to the SECC, and receive a response message to the wireless communication connection request from the SECC.

Furthermore, in accordance with embodiments of the present disclosure, a conductive electric vehicle (EV) charging method performed in an SECC may be provided. The method may comprise establishing a wireless communication connection with an ICCB mounted on an EV charging cable, and receiving information on an EV connected to the EV charging cable; transmitting an identifier of the EV and an identifier of the SECC which are included in the information on the EV to a community server; receiving an identifier of the community server from the community server; and transmitting the identifier of the community server to an electric vehicle communication controller (EVCC).

The wireless communication connection may be established using a wireless fidelity (Wi-Fi) communication protocol according to an international standardization organization (ISO) 15118-8.

The method may further include receiving charging information according to a charging loop from the EVCC; and transmitting the received charging information and the information on the EV to the community server.

The charging information may include at least one of an amount of energy requested by the EV, a state of charge (SOC) indicating an amount of energy expected when a battery of the EV is fully charged, and a SOC indicating an amount of energy expected when a charging is completed.

The information on the EV may include at least one of status information of the EV an allowable maximum current for the EV, an allowable maximum voltage for the EV, and a maximum energy capacity of a battery of the EV.

The information on the EV may further include at least one of an amount of energy charged in the battery of the EV and a charging mode of the EV.

The method may further include receiving a charging completion message from the EVCC; and transmitting a billing request message according to the charging completion message to the community server. The billing request message may include at least one of an amount of energy charged in the EV and the identifier of the EV.

Furthermore, in accordance with embodiments of the present disclosure, a SECC may be provided. The SECC may include at least one processor, a memory storing instructions executed by the at least one processor, and a communication module, wherein the instructions are configured to cause the communication module to establish a wireless communication connection with an ICCB mounted on an EV charging cable, and receive information on an EV connected to the EV charging cable; cause the communication module to transmit an identifier of the EV and an identifier of the SECC which are included in the information on the EV to a community server; cause the communication module to receive an identifier of the community server from the community server; and cause the communication module to transmit the identifier of the community server to an electric vehicle communication controller (EVCC).

The wireless communication connection may be established using a wireless fidelity (Wi-Fi) communication protocol according to an international standardization organization (ISO) 15118-8.

The instructions may be further configured to cause the communication module to receive charging information according to a charging loop from the EVCC; and cause the communication module to transmit the received charging information and the information on the EV to the community server.

The instructions may be further configured to cause the communication module to receive a charging completion message from the EVCC; and cause the communication module to transmit a billing request message according to the charging completion message to the community server.

Using an ICCB mounted on an EV charging cable and a wireless charging method according to embodiments of the present disclosure, a mobile communication may not be used for external internet connection, thereby reducing communication costs burdened on users. Also, as international standard technology is applied, there is no need to apply additional technology for smart charging, automatic payment, and security. Furthermore, EVs are connected directly to the Internet or a cloud service during charging, so that various additional services can be provided. In addition, there is an advantage of effectively charging an EV and performing billing for the charging in buildings, shopping malls, and public facilities for various purposes besides apartment houses.

BRIEF DESCRIPTION OF DRAWINGS

Embodiments of the present disclosure will become more apparent by describing in detail embodiments of the present disclosure with reference to the accompanying drawings, in which.

Figure 1:
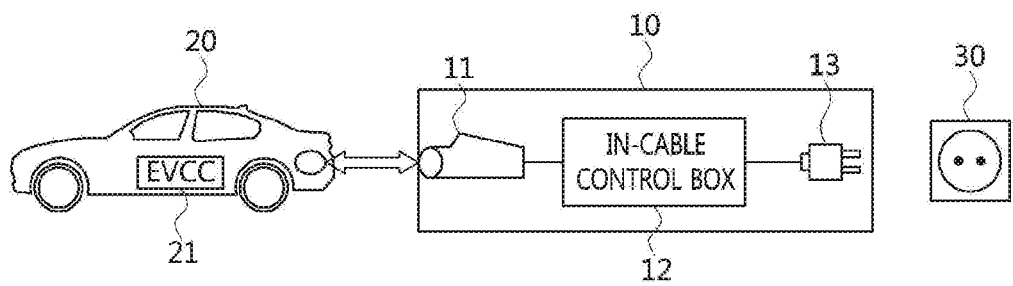
FIG. 1 is a conceptual diagram for explaining an EV conductive charging method according to an embodiment of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment

DETAILED DESCRIPTION

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein. While describing the respective drawings, like reference numerals designate like elements.

It will be understood that although the terms "first," "second," etc. may be used herein to describe various components, these components should not be limited by these terms. These terms are used merely to distinguish one element from another. For example, without departing from the scope of the present disclosure, a first component may be designated as a second component, and similarly, the second component may be designated as the first component. The term "and/or" include any and all combinations of one of the associated listed items.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components.

Terms are used herein only to describe the embodiments but not to limit the present disclosure. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present specification, are not interpreted as being ideal or excessively formal meanings.

Terms used in the present disclosure are defined as follows.

"Electric Vehicle, EV": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be four or more wheeled vehicle manufactured for use primarily on public streets, roads.

The EV may be referred to as an electric car, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle, PEV": An Electric Vehicle that recharges the on-vehicle primary battery by connecting to the power grid.

"Plug-in vehicle, PV": An electric vehicle rechargeable through wireless charging from an electric vehicle supply equipment (EVSE) without using a physical plug or a physical socket.

"Heavy duty vehicle; H.D. Vehicle": Any four-or more wheeled vehicle as defined in 49 CFR 523.6 or 49 CFR 37.3 (bus).

"Light duty plug-in electric vehicle": A three or four-wheeled vehicle propelled by an electric motor drawing current from a rechargeable storage battery or other energy devices for use primarily on public streets, roads and highways and rated at less than 4,545 kg gross vehicle weight.

"Wireless power charging system, WCS": The system for wireless power transfer and control between the GA and VA including alignment and communications. This system transfers energy from the electric supply network to the electric vehicle electromagnetically through a two-part loosely coupled transformer.

"Wireless power transfer, WPT": The transfer of electrical power from the AC supply network to the electric vehicle by contactless means.

"Utility": A set of systems which supply electrical energy and include a customer information system (CIS), an advanced metering infrastructure (AMI), rates and revenue system, etc. The utility may provide the EV with energy through rates table and discrete events. Also, the utility may provide information about certification on EVs, interval of power consumption measurements, and tariff.

"Smart charging": A system in which EVSE and/or PEV communicate with power grid in order to optimize charging ratio or discharging ratio of EV by reflecting capacity of the power grid or expense of use.

"Automatic charging"; A procedure in which inductive charging is automatically performed after a vehicle is located in a proper position corresponding to a primary charger assembly that can transfer power. The automatic charging may be performed after obtaining necessary authentication and right.

"Interoperability": A state in which component of a system interwork with corresponding components of the system in order to perform operations aimed by the system. Also, information interoperability may mean capability that two or more networks, systems, devices, applications, or components can efficiently share and easily use information without giving inconvenience to users.

"Inductive charging system": A system transferring energy from a power source to an EV through a two-part gapped core transformer in which the two halves of the transformer, primary and secondary coils are physically separated from one another. In the present disclosure, the inductive charging system may correspond to an EV power transfer system.

"Inductive coupler": The transformer formed by the coil in the GA Coil and the coil in the VA Coil that allows power to be transferred with galvanic isolation.

"Inductive coupling": Magnetic coupling between two coils. In the present disclosure, coupling between the GA Coil and the VA Coil.

"Ground assembly, GA": An assembly on the infrastructure side consisting of the GA Coil, a power/frequency conversion unit and GA controller as well as the wiring from the grid and between each unit, filtering circuits, housing(s) etc., necessary to function as the power source of wireless power charging system. The GA may include the communication elements necessary for communication between the GA and the VA.

"Vehicle assembly, VA": An assembly on the vehicle consisting of the VA Coil, rectifier/power conversion unit and VA controller as well as the wiring to the vehicle batteries and between each unit, filtering circuits, housing (s), etc., necessary to function as the vehicle part of a wireless power charging system. The VA may include the communication elements necessary for communication between the VA and the GA.

The GA may be referred to as a primary device (PD), and the VA may be referred to as a secondary device (SD).

"Primary device": An apparatus which provides the contactless coupling to the secondary device. That is, the primary device may be an apparatus external to an EV. When the EV is receiving power, the primary device may act as the source of the power to be transferred. The primary device may include the housing and all covers.

"Secondary device": An apparatus mounted on the EV which provides the contactless coupling to the primary device. That is, the secondary device may be installed in the EV, When the EV is receiving power, the secondary device may transfer the power from the primary to the EV. The secondary device may include the housing and all covers.

"GA controller": The portion of the GA which regulates the output power level to the GA Coil based on information from the vehicle.

"VA controller": The portion of the VA that monitors specific on-vehicle parameters during charging and initiates communication with the GA to control output power level.

The GA controller may be referred to as a primary device communication controller (PDCC), and the VA controller may be referred to as an electric vehicle communication controller (EVCC).

"Magnetic gap": The vertical distance between the plane of the higher of the top of the litz wire or the top of the magnetic material in the GA Coil to the plane of the lower of the bottom of the litz wire or the magnetic material in the VA Coil when aligned.

"Ambient temperature": The ground-level temperature of the air measured at the subsystem under consideration and not in direct sun light.

"Vehicle ground clearance": The vertical distance between the ground surface and the lowest part of the vehicle floor pan.

"Vehicle magnetic ground clearance": The vertical distance between the plane of the lower of the bottom of the litz wire or the magnetic material in the VA Coil mounted on a vehicle to the ground surface.

"VA Coil magnetic surface distance": the distance between the plane of the nearest magnetic or conducting component surface to the lower exterior surface of the VA coil when mounted. This distance includes any protective coverings and additional items that may be packaged in the VA Coil enclosure.

The VA coil may be referred to as a secondary coil, a vehicle coil, or a receive coil. Similarly, the GA coil may be referred to as a primary coil, or a transmit coil.

"Exposed conductive component": A conductive component of electrical equipment (e.g. an electric vehicle) that may be touched and which is not normally energized but which may become energized in case of a fault.

"Hazardous live component": A live component, which under certain conditions can give a harmful electric shock.

"Live component": Any conductor or conductive component intended to be electrically energized in normal use.

"Direct contact": Contact of persons with live components. (See IEC 61440)

"Indirect contact": Contact of persons with exposed, conductive, and energized components made live by an insulation failure. (See IEC 61140)

"Alignment": A process of finding the relative position of primary device to secondary device and/or finding the relative position of secondary device to primary device for the efficient power transfer that is specified. In the present disclosure, the alignment may direct to a fine positioning of the wireless power transfer system.

"Pairing": A process by which a vehicle is correlated with the unique dedicated primary device, at which it is located and from which the power will be transferred. The pairing may include the process by which a VA controller and GA controller of a charging spot are correlated. The correlation/association process may include the process of the establishment of a relationship between two peer communication entities.

"Command and control communication": The communication between the EV supply equipment and the EV exchanges information necessary to start, control and terminate the process of WPT.

"High level communication (HLC)": HLC is a special kind of digital communication. HLC is necessary for additional services which are not covered by command & control communication. The data link of the HLC may use a power line communication (PLC), but it is not limited.

"Low power excitation (LPE)": LPE means a technique of activating the primary device for the fine positioning ad pairing so that the EV can detect the primary device, and vice versa.

"Service set identifier (SSID)": SSID is a unique identifier consisting of 32-characters attached to a header of a packet transmitted on a wireless LAN. The SSID identifies the basic service set (BSS) to which the wireless device attempts to connect. The SSID basically distinguishes multiple wireless LANs. Therefore, all access points (Aps) and all terminal/station devices that want to use a specific wireless LAN can use the same SSID. Devices that do not use a unique SSID are not able to join the BSS. Since the SSID is shown as plain text, it may not provide any security features to the network.

"Extended service set identifier (ESSID)": ESSID is the name of the network to which you want to connect. It is similar to SSID but can be a more extended concept.

"Basic service set identifier (BSSID)": BSSID consisting of 48 bits is used to distinguish a specific BSS. In the case of an infrastructure BSS network, the BSSID may be medium access control (MAC) of the AP equipment. For an independent BSS or ad hoc network, the BSSID can be generated with any value.

The charging station may comprise at least one GA and at least one GA controller managing the at least one GA. The GA may comprise at least one wireless communication device. The charging station may mean a place having at least one GA, which is installed in home, office, public place, road, parking area, etc.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller conjunction with one or more other components, as would be appreciated by a person of ordinary skill in the art.

In an embodiment of the present disclosure, a "rapid charging" may refer to a method of directly converting AC power of a power system to DC power, and supplying the converted DC power to a battery mounted on an EV. Here, a voltage of the DC power may be DC 500 volts (V) or less.

In an embodiment of the present disclosure, a "slow charging" may refer to a method of charging a battery mounted on an EV using AC power supplied to a general home or workplace. An outlet in each home or workplace, or an outlet installed in a charging stand may provide the AC power, and a voltage of the AC power may be AC 220V or less. Here, the EV may further include an on-board charger (OBC) which is a device capable of boosting the AC power for the slow charging, converting the AC power to DC power, and supplying the converted DC power to the battery.

Hereinafter, preferred embodiments according to the present disclosure will be described in detail with reference to the accompanying drawings.

FIG. 1 is a conceptual diagram for explaining an EV conductive charging method according to an embodiment of the present disclosure.

Referring to FIG. 1, an EV conductive charging method may be performed based on interoperations among an EV charging cable 10, an EV 20, and a power outlet 30 installed in an existing building or charging stand.

Here, the EV 20 may be generally defined as an automobile that supplies an electric current from a rechargeable energy storage device such as a battery mounted on the EV 20 as an energy source of an electric motor.

However, the EV 20 according to the present disclosure may include a hybrid electric vehicle (HEV) having an electric motor and an internal combustion engine together, and may be not only an automobile but also a motorcycle, a cart, a scooter, or an electric bicycle.

Further, the EV 20 according to the present disclosure may include an inlet for conductively charging the battery.

Here, the EV 20 capable of conductively charging the battery may be referred to as a plug-in electric vehicle (PEV) defined above.

The inlet provided in the EV 20 according to the present disclosure may support the slow charging (also referred to as an 'on-board charging') or the rapid charging. Here, the EV 20 may include either a single inlet that supports both of the slow charging and the rapid charging through one plug connection, or inlets that respectively support the slow charging and the rapid charging.

Still further, the EV 20 according to the present disclosure may include an EVCC for communicating with other external devices inside or outside, and may use the EVCC to control the conductive charging by communicating with an external charging stand or the EV charging cable 10 (i.e., an ICCB mounted on the EV charging cable 10).

In addition, the EV 20 according to the present disclosure may further include an on-board charger (OBC) to support the slow charging through alternating current (AC) power supplied from a general power system. The OBC may boost the AC power supplied from the general power system to be supplied to the battery in the EV 20 at the time of the slow charging. Accordingly, when the AC power for the slow charging is supplied to the inlet of the EV 20, the slow charging may be performed through the OBC. Further, when a direct current (DC) power for the rapid charging is supplied to the corresponding inlet, the rapid charging may be performed without the OBC.

The EV charging cable 10 may include at least one of a charging plug 11 which is connected to the inlet of the EV, an outlet plug 13 which is connected to the outlet 30, and the ICCB 12.

The charging plug 11 may be a connection part that can be electrically connected to the inlet of the EV 20.

The ICCB 12 may communicate with the EVCC of the EV 20 to receive status information of the EV or to control the electric power charging to the EV 20.

Although the ICCB 12 is illustrated as being included in the EN charging cable 10, it may be mounted in a place other than the EV charging cable 10, or may be combined with an SECC described below or replaced with the SECC.

The outlet plug 13 may be connected to the outlet to which power is supplied as an electrical connection mechanism such as a general plug or a cord set.

For example, the electric power outlet 30 may refer to an outlet installed at various places such as a parking lot attached to a house of an owner of the EV 20, a parking area for charging an EV at a gas station, or a parking area at a shopping center or an office building.

In addition, a device for controlling a charging procedure by communicating with one of the components of the ICCB 12 or the EV 20 (e.g., EVCC) may be installed in a building or place (e.g., a charging stand) where the outlet 30 is installed. Such the device may be referred to as the SECC.

Here, the SECC may communicate with an infrastructure management system for managing a power grid, a management server (a 'community server' which will be described later) of an apartment house in which the outlet 30 is installed, or an infrastructure server through wired or wireless communications.

Further, the outlet 30 may supply AC power of the power system as it is. For example, AC power corresponding to at least one of single-phase two-wire (1P2W) type and three-phase four-wire (3P4W) type may be supplied.

The EV charging cable 10 may support the slow charging, and supply electric power for the slow charging to the EV 20. Here, electric power of 3.3 to 7.7 kWh may be supplied to the EV 20 for the slow charging.

The EV charging cable 10 may further support the rapid charging, and supply electric power for the rapid charging to the EV 20. Here, electric power of 50 to 100 kWh may be supplied to the EV 20 for the rapid charging.

Figure 2:
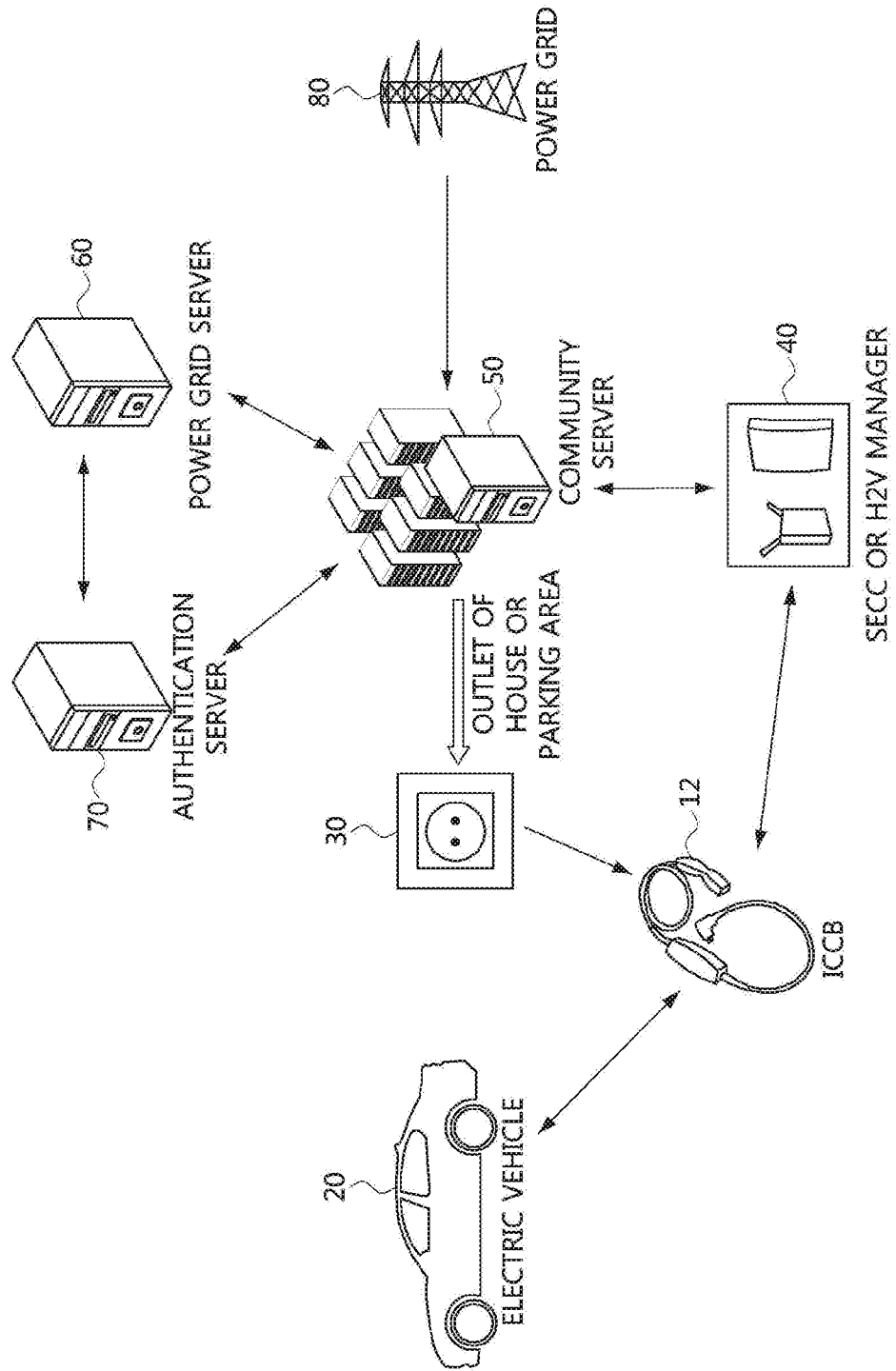
FIG. 2 is a conceptual diagram illustrating an environment to which an EV conductive charging method according to an embodiment of the present disclosure is applied.

FIG. 2 is a conceptual diagram illustrating an environment to which an EV conductive charging method according to an embodiment of the present disclosure is applied.

The conductive charging method may be performed based on interoperations among various entities including the ICCB 12, the EV 20, the outlet 30 installed in each home or apartment house, a community server 50 for performing management including billing for power supplied through the outlet 30, an SECC 40 for transmitting and receiving information on the charging being performed through wireless communications with the community server 50 and the ICCB 12, a power grid server. 60 operating a power grid 80 supplied to each home or apartment house, and an authentication server 70 for performing authentication on the EV 20 or a user of the EV 20.

Here, the interoperations among the ICCB 12, the EV 20, and the outlet 30 may be referred to explanations of FIG. 1, so that interoperations among the other entities will be described.

The SECC 40 may support the conductive charging for the EV 20 by relaying the ICCB 12 and the community server 50 that manages the outlet 30 through wired or wireless communications.

For example, the SECC 40 may refer to an access point (AP) or a wireless router, and may also be referred to as a home-to-vehicle (H2V) manager. Here, the SECC or H2V Manager may stop the charging temporarily when power consumption increases greatly or exceeds a contract power as many electric appliances are used simultaneously in the household where the outlet 30 is installed, and may resume the charging when a power enough for the charging of the EV 20 becomes available.

The community server 50 may be a server for power supply and management of an apartment house, perform billing for the EV charging in cooperation with the power grid server 60. Also, the community server 50 may perform authentication on the ICCB 12, the EV 20, or the user of the EV 20 in cooperation with the authentication server 70. For example, the community server 50 may perform the authentication by checking a predefined certificate in conjunction with the authentication server 70.

Further, the community server 50 may monitor the amount of power (e.g., the amount of electric power (energy) charged in the EV) used in the apartment house through a watt-hour meter installed in the apartment house in conjunction with the power grid 80 that supplies electric power to the apartment house.

The power grid server 60 may be a server that manages the power network 80 that supplies electric power to the apartment house, or performs billing for the charging. The power grid server 60 may be operated by an electric company. Specifically, the power grid server 60 may control electric power supply for charging the EV in the apartment house in cooperation with the community server 50, or perform billing for the EN or the user of the EV by checking the amount of energy used to charge the EV.

Further, the power grid server. 60 may supply electric power for the EV charging only to an authenticated EV user in cooperation with the authentication server 70.

The authentication server 70 may perform authentication on the EV, the user of the EV, or the EV charging cable in cooperation with the community server 50 or the power grid server 60. For example, the authentication server 70 may store authentication information such as an identifier of the user or the EV, encryption and decryption keys, an authentication password, and a certificate for the authentication on the user, and perform the authentication by checking whether the stored authentication information are matched to received user information.

Figure 3:
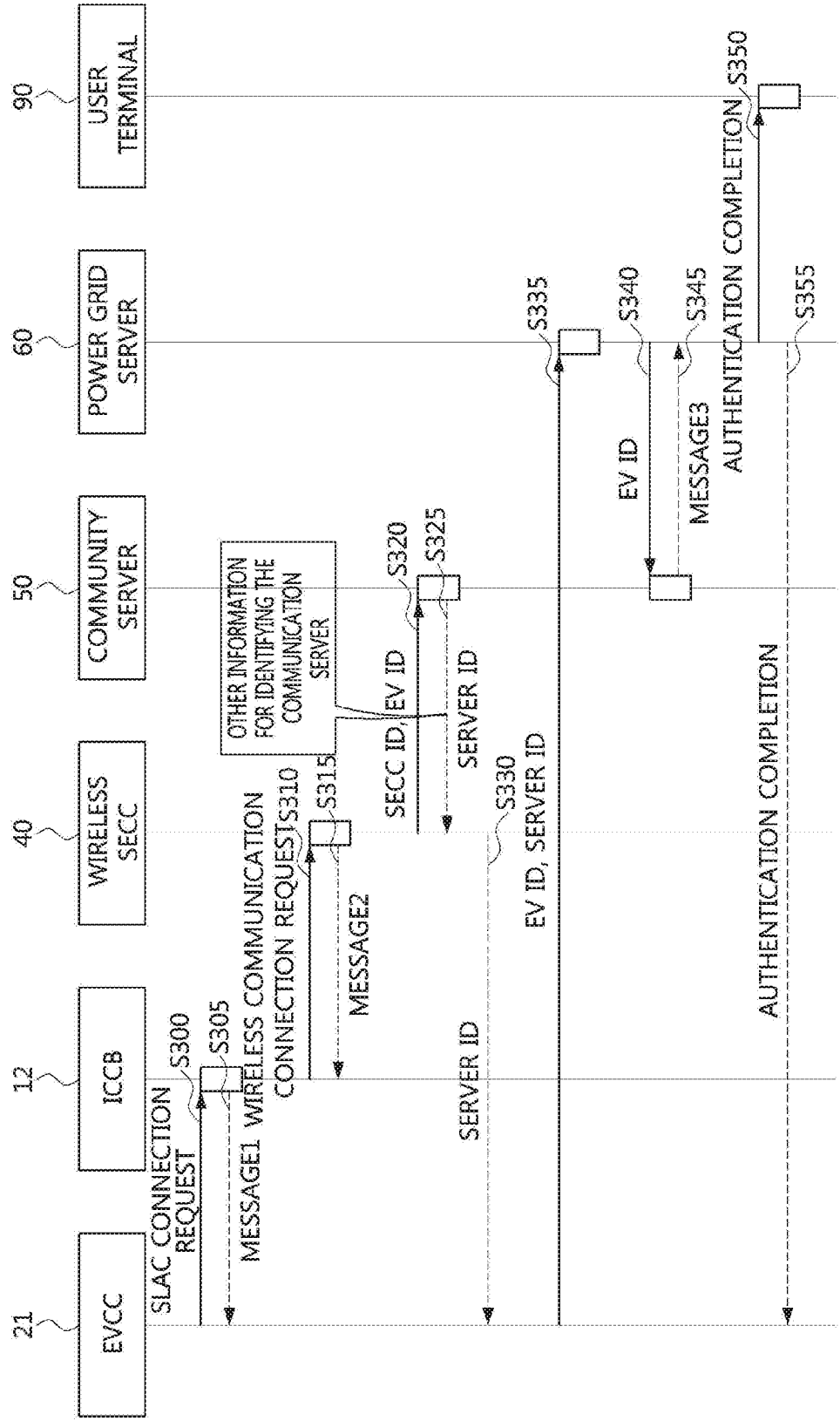
FIG. 3 is a first sequence chart for explaining an EV conductive charging method according to an embodiment of the present disclosure.

FIG. 3 is a first sequence chart for explaining an EV conductive charging method according to an embodiment of the present disclosure.

Referring to FIG. 3, a step of connecting a charging cable and a step of establishing a communication connection for an EV conductive charging method according to an embodiment of the present disclosure will be described.

First, a step of establishing a communication connection may be performed between the EVCC 21 and the ICCB 12 (S300). In order to establish the communication connection, the EVCC 21 may send a signal or message for establishment of the communication connection to the ICCB 12.

Here, the communication connection between the EVCC 21 and the ICCB 12 may be performed by power-line communications (PLC), which may be carried out using a communication protocol conforming to an international standard communication protocol such as international standardization organization (ISO) 15118-3 or ISO 12139.

For example, a signal level attenuation characterization (SLAC) scheme may be used as a method for establishing the communication connection between the EVCC 21 and the ICCB 12. The establishment of the communication connection based on the SLAC scheme may operate in a request and response manner, and a response may be made based on various levels of signal attenuation so that the physically connected EVCC 21 and ICCB 12 identify each other correctly.

When the ICCB 12 receives a request message for the communication connection from the EVCC 21, the ICCB 12 may transmit a first message (denoted as 'Message1' in FIG. 2) as a response to and for confirming the request message for the communication connection to the EVCC 21 (S305).

When the communication connection is established between the EVCC 21 and the IVCC, the ICCB 12 may establish a wireless communication connection with the SECC 40 (S310). Specifically, when the ICCB 12 transmits a request message for the wireless communication connection to the SECC 40, the SECC 40 may transmit a second message (denoted as 'Message2' in FIG. 2) as a response to the request message to the ICCB 12 (S315).

When the communication connection is established between the ICCB 12 and the SECC 40, the SECC 40 may transmit an identifier of the SECC 40 (i.e., an 'SECC ID') and an identifier of the EV (i.e., an 'EV ID') to the community server 50 (S320) through the ICCB 40. That is, the EV ID may be transmitted from the EVCC 21 to the ICCB 12, and then transmitted from the ICCB 12 to the SECC 40, but is not limited thereto. That is, the EV ID may also be obtained using other sensors or recognition devices connected to the SECC 40.

The community server 50 may simply transmit an identifier of the community server 50 (i.e., a 'server ID') or an identifier of an apartment house managed by the community server 50 to the SECC 40 (S325), and the SECC 40 may transmit the received served ID to the EVCC 21 (S330). Here, the communication between the EVCC 21 and the SECC 40 may be performed by mobile communication such as Long-Term Evolution (LTE) or wireless communication such as Wireless Fidelity (Wi-Fi).

Alternatively or additionally, the community server 50 may transmit other information for identifying the community server 50 (e.g., address, location, server. IP address, server MAC Address, zip code, etc.) to the SECC 40.

The EVCC 21 may transmit at least one of the EV ID and the server ID to the power grid server 60 (S335). The power grid server 60 may transmit the received EV ID to the corresponding community server 50 (S340), and identify information on a charging preparation state for the EV indicated by the EV ID front the community server 50.

Here, the community server 50 may perform authentication on the EV indicated by the received EV ID or the user of the EV indicated by the received EV II) in cooperation with an authentication server. After the authentication is completed, an authentication completion message may be transmitted to the power grid server 60 by the community server 50.

Further, the cooperation with the authentication server may be performed not only by the community server 50 but also by the power grid server 60. For example, when the power grid server 60 receives a response message (denoted as 'message3' in FIG. 3) for reception of the EV ID from the community server 50 (S345), the power grid server 60 may perform authentication on the EV indicated by the EV ID or the user of the EV indicated by the EV ID in cooperation with the authentication server. After the authentication is completed, an authentication completion message may be transmitted to a user terminal 90 which is a terminal owned by the user of the EV or a terminal interworking with the EV (S350).

Also, the power grid server 60 may transmit an authentication completion message to the EVCC 21 (S355).

The above-described authentication performed with the authentication server may be performed selectively at one of the power grid server 60 and the community server 50 or may be performed at both the power grid server 60 and the community server 50.

Through the above-described process, the electric company may complete the authentication on the user or the user terminal 90 desiring to receive a charging service for the EV in the apartment house. In addition, the electric company may complete the authentication on the EV desiring to receive the charging service or the EVCC 21 installed in the EV desiring to receive the charging service in the apartment house such as an apartment complex.

Here, the user terminal 90 may be one of various devices having a communication capability, such as a desktop computer, a laptop computer, a smart phone, a tablet PC, a mobile phone, a smart watch, a smart glass, an e-book reader, a portable multimedia player (PMP), a portable game player, a navigation device, a digital camera, a digital multimedia broadcasting (DMB) player, a digital audio recorder, a digital audio player, a digital video recorder, a digital video player, a Personal Digital Assistant (PDA), and the like.

Figure 4:
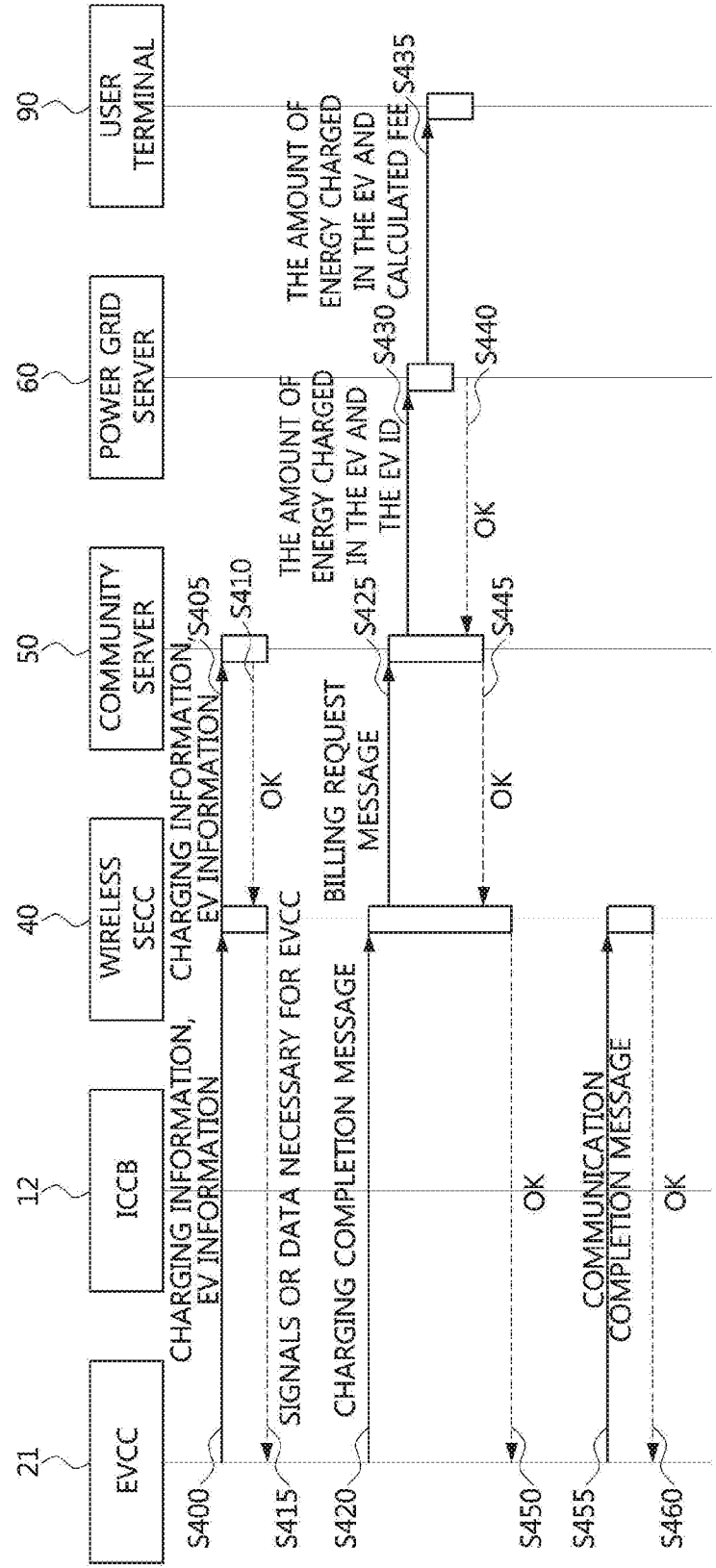
FIG. 4 is a second sequence chart for explaining an EV conductive charging method according to an embodiment of the present disclosure.

FIG. 4 is a second sequence chart for explaining an EV conductive charging method according to an embodiment of the present disclosure.

Referring to FIG. 4, an EV charging process after the authentication of FIG. 3 is completed will be described.

First, the EVCC 21 may transmit at least one of charging information according to a charging loop and information on the EV (hereinafter, referred to as 'EV information') to the SECC 40 (S400).

Here, the charging loop may indicate a charging process performed repeatedly during the is slow charging.

The charging information may include at least one of the amount of electric power (energy) requested by the EV (hereinafter, referred to as 'EV Energy Request'), a state of charge (SOC) indicating the amount of energy expected when the battery is fully charged (hereinafter, referred to as 'Full SOC'), and an SOC indicating the amount of energy expected when the charging process is completed (hereinafter, referred to as 'Bulk SOC'). Here, the EV Energy Request, full SOC, and bulk SOC may be represented in percentages.

Further, the EV information may include at least one of status information of the EV (hereinafter, referred to as 'EV status'), an allowable maximum current for the EV (hereinafter, referred to as 'EV maximum current limit', an allowable maximum voltage for the EV (hereinafter, referred to as 'EV maximum voltage limit', and a maximum energy capacity of the EV battery (hereinafter, referred to as 'EV Energy Capacity').

The EV information may further include at least one of the amount of energy charged in the EV battery and a charging mode of the EV.

Then, the SECC 40 may transmit the charging information and the EV information acquired from the EVCC 21 to the community server 50 (S405). For example, the SECC 40 may periodically or intermittently provide the community server with information on the amount of electric power charged in the EV and the EV ID. The community server 50 may store the EV ID and the amount of charged electric power and send a response (i.e., 'OK') to the SECC 40 (S410). In addition, the SECC 40 may transmit signals or data necessary for the EVCC 21 during the charge loop of the EV (S415).

On the other hand, in a case that the amount of energy charged in the EV battery is equal to or higher than a predetermined reference value or satisfies a predetermined charging completion condition, the EVCC 21 may transmit a charging completion message to the SECC 40 (S420). Here, the EVCC 21 may transmit information on the amount of energy charged in the EV battery to the SECC 40 simultaneously or sequentially with the charging completion message.

The SECC 40 may transmit a billing request message including the amount of energy charged in the EV and the EV ID to the community server 50 (S425).

According to the billing request message, the community server 50 may inform including the amount of energy charged in the EV and the EV ID to the power grid server 60 (S430). Then, the power grid server 60 may calculate a fee based on the amount of energy charged in the EV, transmit at least one of the calculated fee and the amount of energy charged in the EV to the user terminal 90 owned by the user of the EV or interworking with the EV (S435), and transmit a response according to the completion of the billing to the community server 50 (S440).

Then, the community server 50 may transmit a response ('OK') in response to the billing request message of the SECC 40 to the SECC 40 (S445). The SECC 40 may transmit a response (OK) indicating that the billing has been completed to the EVCC 21 according to the response of the community server 50 (S450).

The EVCC 21 may transmit a communication completion message to the SECC 40 in response to the completion of charging and billing (S455). The SECC 40 may transmit a response (OK) to the communication completion message to the EVCC 21 (S460).

In the above-described embodiment, when a response (OK) is not received, the transmitting side may retransmit the corresponding message to the receiving side by a predetermined number of times. In addition, if a failure response other than the OK response is received from the receiving side, the transmitting side may transmit a failure response in the reverse direction and may resume the charging process from the beginning or from the time stored in the community server or the amount of energy stored correctly in the EV battery.

Figure 5:
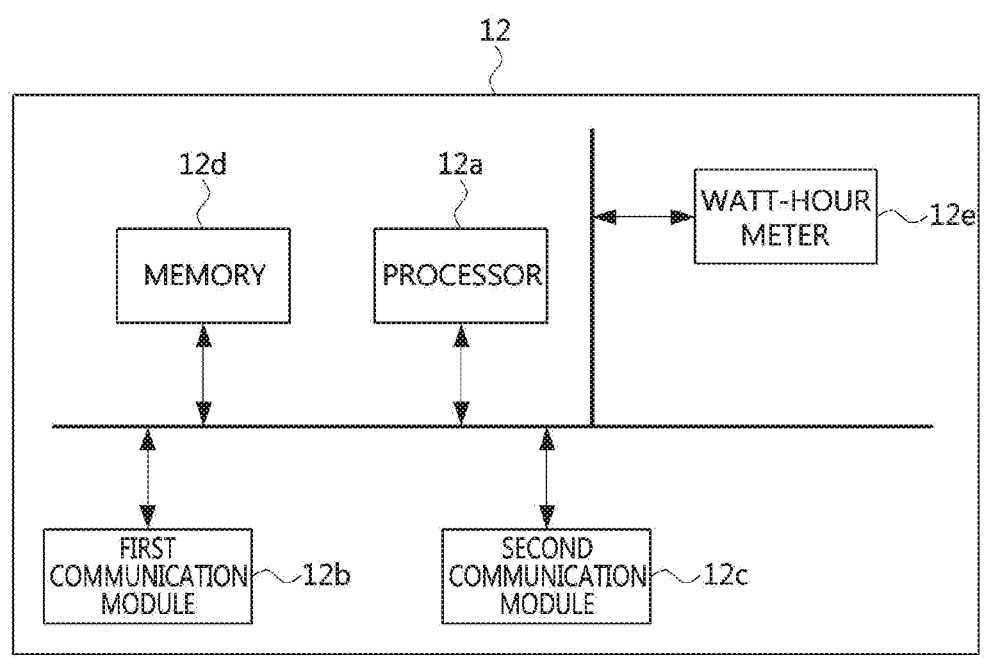
FIG. 5 is a diagram illustrating an ICCB according to an embodiment of the present disclosure.

FIG. 5 is a diagram illustrating an ICCB according to an embodiment of the present disclosure.

Referring to FIG. 5, an embodiment of the configuration of the ICCB 12 mounted on the EV charging cable 10 in FIG. 1 will be described.

The ICCB 12 mounted on an EV charging cable may include at least one processor 12a, a first communication module 12b, a second communication module 12c, and a memory 12d storing instructions executed by the at least one processor 12a. Further, the instructions may be configured to cause the first communication module 12b to collect information on the EV by communicating with an EVCC in the EV, and cause the second communication module 12c to transmit the information collected by the first communication module 12b to an SECC.

The ICCB 12 may further include a watt-hour meter 12e for accumulating and measuring the amount of electric power charged in the EV.

The at least one processor 12a, the first communication module 12b, the second communication module 12c, the memory 12d, and the watt-hour meter 12b may be connected through a bus or connected directly to each other.

The first communication module 12b may perform a power line communication (PLC). The second communication module 12c may perform a Wireless Fidelity (Wi-Fi) communication. The PLC communication may use a communication protocol according to ISO 15118-3 or ISO 12139. The Wi-Fi communication may use a communication protocol according to ISO 15118-8.

In response to an SLAC communication connection request from the EVCC, the instructions executed by the at least one processor 12a may be further configured to control the first communication module 12b to establish a communication connection with the EVCC through SLAC.

The instructions executed by the at least one processor 12b may be further configured to control the second communication module 12c to transmit a wireless communication connection request to the SECC and receive a response message to the wireless communication connection request from the SECC.

Figure 6:
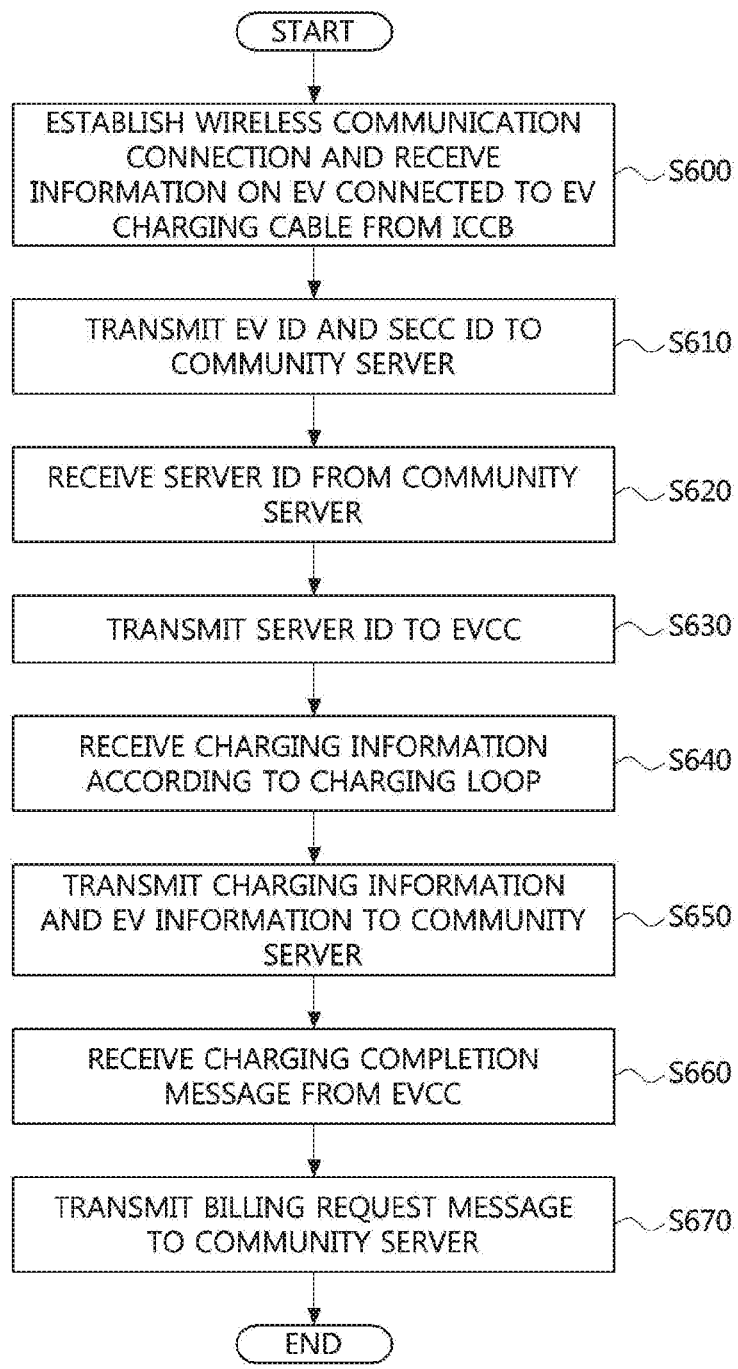
FIG. 6 is a flow chart for explaining an electric vehicle conductive charging method performed in an SECC according to an embodiment of the present disclosure.

FIG. 6 is a flow chart for explaining an electric vehicle conductive charging method performed in an SECC according to an embodiment of the present disclosure.

Referring to FIG. 6, an EV conductive charging method performed in an SECC may include a step S600 of establishing a wireless communication connection with an ICCB mounted on the EV charging cable and receiving information on an EV (i.e., 'EV information') connected to the EV charging cable; a step S610 of transmitting an EV ID and an SECC ID included in the EV information to a community server, a step S620 of receiving a server ID from the community server, and a step S630 of transmitting the server ID of the community server to a EVCC of the EV.

Here, the wireless communication connection may be established using a WIFI communication protocol according to ISO 15118-8.

The EV conductive charging method may further include a step S640 of receiving charging information according to a charging loop from the EVCC, and a step S650 of transmitting the received charging information and the EV information to the community server.

The charging information may include at least one of the EV Energy Request, the Full SOC, and the Bulk SOC.

The EV information may include at least one of the EV status, the EV maximum current limit, the EV maximum voltage limit, and the EV Energy Capacity. Also, the EV information may further include at least one of the amount energy charged in the EV battery and a charging mode of the EV.

The EV conductive charging method may further include a step S660 of receiving a charging completion message from the EVCC, and a step S670 of transmitting a billing request message to the community server. The billing request message may include at least one of the amount of energy charged in the EV and the EV ID.

Figure 7:
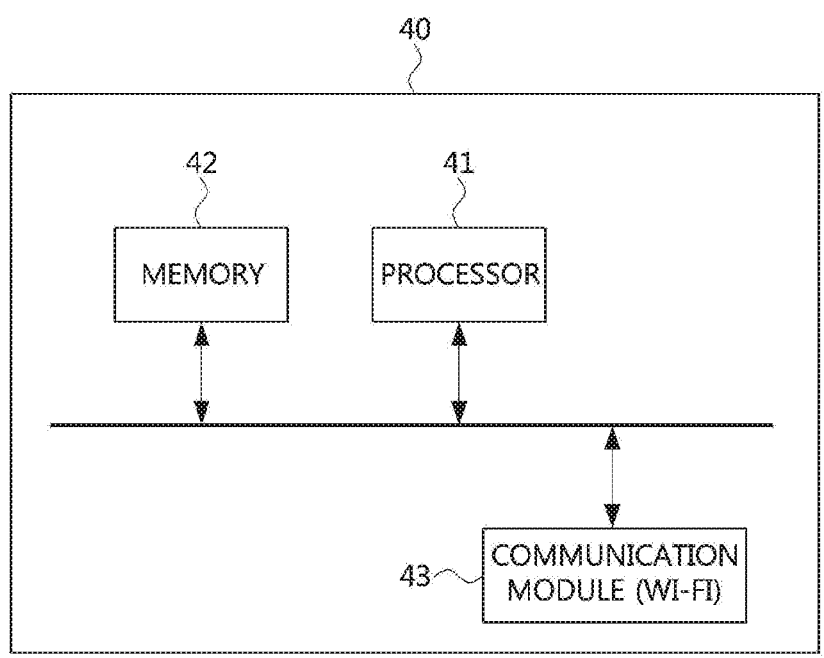
FIG. 7 is a diagram illustrating an SECC according to an embodiment of the present disclosure.

FIG. 7 is a diagram illustrating an SECC according to an embodiment of the present disclosure.

Referring to FIG. 7, the SECC 40 may include at least one processor 41, a memory 42 storing instructions executed by the at least one processor 41, and a communication module 43 transmitting and receiving Tireless communication messages under control of the at least one processor 41.

The communication module 43 may support a Wi-Fi communication.

Here, the instructions may be configured to establish a wireless communication connection with an ICCB mounted on the EV charging cable and receive EV information of an EV connected to the EV charging cable, transmit an IN ID and an SECC ID included in the EV information to a community server, receive a server ID from the community server, and transmit the server ID of the community server to a EVCC of the EV.

The wireless communication connection may be established using a WIFI communication protocol according to ISO 15118-8.

The instructions may be further configured to receive charging information according to a charging loop from the EVCC, and transmit the received charging information and the EV information to the community server. Also, the instructions may be further configured to receive a charging completion message from the EVCC, and transmit a billing request message to the community server.

The SECC 40 may perform the process according to FIG. 3 and FIG. 4 or the process according to FIG. 6, and a detailed description thereof will be omitted in order to avoid redundant explanations.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail, it should be understood that various changes, substitutions and alterations may be made herein without departing from the scope of the disclosure.

What is claimed is:

1. An in-cable control box (ICCB) mounted on an electric vehicle (EV) charging cable, comprising at least one processor, a first communication module, a second communication module, and a memory storing instructions which, when executed by the at least one processor, cause the at least one processor to:
   cause the first communication module to collect information on an EV by communicating with an electric vehicle communication controller (EVCC) of the EV; and
   cause the second communication module to transmit the information on the EV to a supply equipment communication controller (SECC),
   wherein the second communication module performs a wireless fidelity (Wi-Fi) communication, and
   wherein the information on the EV includes at least one of status information of the EV, an allowable maximum current for the EV, an allowable maximum voltage for the EV, or a maximum energy capacity of a battery of the EV.

2. The ICCB according to claim 1, further comprising a watt-hour meter for cumulatively measuring an amount of electric power charged into the EV.

3. The ICCB according to claim 1, wherein the first communication module performs a power line communication (PLC).

4. The ICCB according to claim 3, wherein the PLC conforms to a protocol according to an international standardization organization (ISO) 15118-3 or an ISO 12139.

5. The ICCB according to claim 1, wherein the Wi-Fi communication conforms to a protocol according to an ISO 15118-8.

6. The ICCB according to claim 4, wherein the instructions, when executed by the at least one processor, further cause the at least one processor to cause the first communication module to establish a communication connection with the EVCC based on a signal level attenuation characterization (SLAC) communication according to a SLAC communication connection request from the EVCC.

7. The ICCB according to claim 5, wherein the instructions, when executed by the at least one processor, further cause the at least one processor to cause the second communication module to transmit a wireless communication connection request to the SECC, and receive a response message to the wireless communication connection request from the SECC.

8. A conductive electric vehicle (EV) charging method performed in a supply equipment communication controller (SECC), comprising:
   establishing a wireless communication connection with an in-cable control box (ICCB) mounted on an EV charging cable, and receiving information on an EV connected to the EV charging cable;
   transmitting an identifier of the EV and an identifier of the SECC which are included in the information on the EV to a community server;
   receiving an identifier of the community server from the community server; and
   transmitting the identifier of the community server to an electric vehicle communication controller (EVCC), wherein the wireless communication connection is established using a wireless fidelity (Wi-Fi) communication, and wherein the information on the EV includes at least one of status information of the EV, an allowable maximum current for the EV, an allowable maximum voltage for the EV, or a maximum energy capacity of a battery of the EV.

9. The conductive EV charging method according to claim 8, wherein the wireless fidelity (Wi-Fi) communication conforms to a protocol according to an international standardization organization (ISO) 15118-8.

10. The conductive EV charging method according to claim 8, further comprising:
    receiving charging information according to a charging loop from the EVCC; and
    transmitting the received charging information and the information on the EV to the community server.

11. The conductive EV charging method according to claim 10, wherein the charging information includes at least one of an amount of energy requested by the EV, a state of charge (SOC) indicating an amount of energy expected when a battery of the EV is fully charged, and a SOC indicating an amount of energy expected when a charging is completed.

12. The conductive EV charging method according to claim 8, wherein the information on the EV further includes at least one of an amount of energy charged in the battery of the EV and a charging mode of the EV.

13. The conductive EV charging method according to claim 10, further comprising:
    receiving a charging completion message from the EVCC; and
    transmitting a billing request message according to the charging completion message to the community server.

14. The conductive EV charging method according to claim 13, wherein the billing request message includes at least one of an amount of energy charged in the EV and the identifier of the EV.

15. A supply equipment communication controller (SECC) comprising:
    at least one processor, a memory storing instructions executed by the at least one processor, and a communication module,
    wherein the instructions, when executed by the at least one process, cause the at least one processor to:
        cause the communication module to establish a wireless communication connection with an in-cable control box (ICCB) mounted on an EV charging cable, and receive information on an EV connected to the EV charging cable;
        cause the communication module to transmit an identifier of the EV and an identifier of the SECC which are included in the information on the EV to a community server;
        cause the communication module to receive an identifier of the community server from the community server; and
        cause the communication module to transmit the identifier of the community server to an electric vehicle communication controller (EVCC),
    where the wireless communication connection is established using a wireless fidelity (Wi-Fi) communication, and
    wherein the information on the EV includes at least one of status information of the EV, an allowable maximum current for the EV, allowable maximum voltage for the EV, or a maximum energy capacity of a battery of the EV.

16. The SECC according to claim 15, wherein the wireless fidelity (Wi-Fi) communication conforms to a protocol according to an international standardization organization (ISO) 15118-8.

17. The SECC according to claim 15, wherein the instructions, when executed by the at least one process, further cause the at least one processor to:
    cause the communication module to receive charging information according to a charging loop from the EVCC; and
    cause the communication module to transmit the received charging information and the information on the EV to the community server.

18. The SECC according to claim 17, wherein the instructions when executed by the at least one process, further cause the at least one processor to:
    cause the communication module to receive a charging completion message from the EVCC; and
    cause the communication module to transmit a billing request message according to the charging completion message to the community server.

* * * * *